(12) United States Patent
Pedicni

(10) Patent No.: US 6,350,537 B1
(45) Date of Patent: *Feb. 26, 2002

(54) LOAD RESPONSIVE AIR DOOR FOR AN ELECTROCHEMICAL CELL

(75) Inventor: Christopher S. Pedicni, Roswell, GA (US)

(73) Assignee: AER Energy Resources, Inc., Smyrna, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,115

(22) Filed: Dec. 18, 1998

(51) Int. Cl.$^7$ .......................... H01M 4/00; H01M 12/06
(52) U.S. Cl. ............................ 429/27; 429/22; 429/34
(58) Field of Search .............................. 429/27, 34, 38, 429/39, 22, 13, 72, 61, 71, 82, 83, 25, 23

(56) References Cited

U.S. PATENT DOCUMENTS

| | | |
|---|---|---|
| 971,737 A | 10/1910 | Ekströmer |
| 1,163,991 A | 12/1915 | Ford |
| 2,468,430 A | 4/1949 | Derksen ...................... 136/173 |
| 2,493,603 A | 1/1950 | Thomas ....................... 200/113 |
| 2,639,190 A | 5/1953 | Sitzer ........................... 297/12 |
| 3,129,721 A | 4/1964 | Nealley ..................... 137/516.11 |
| 3,473,963 A | 10/1969 | Sanderson ..................... 136/86 |
| 3,613,732 A | 10/1971 | Wilson et al. ............. 137/625.44 |
| 3,716,718 A | 2/1973 | Kaye ..................... 240/10.6 R |
| 4,177,327 A | 12/1979 | Mathews et al. ............... 429/27 |
| 4,180,624 A | 12/1979 | Winsel ........................ 429/54 |
| 4,262,062 A | 4/1981 | Zatsky ........................ 429/27 |
| 4,400,447 A | 8/1983 | Gerenser et al. ............... 429/27 |
| 4,405,387 A | 9/1983 | Albrecht et al. ........ 148/11.5 R |
| 4,457,215 A | 7/1984 | Vogt .............................. 98/103 |
| 4,720,439 A | 1/1988 | Hruden ........................ 429/114 |
| 4,725,202 A | 2/1988 | Zison .......................... 417/138 |
| 4,823,679 A | 4/1989 | Robbins ...................... 98/33.1 |
| 4,855,195 A | 8/1989 | Georgopoulos et al. ....... 429/54 |
| 4,913,983 A | 4/1990 | Cheiky .......................... 429/13 |
| 4,938,742 A | 7/1990 | Smits ............................ 604/67 |
| 4,968,567 A | 11/1990 | Schisselbauer ............... 429/90 |
| 5,080,005 A | 1/1992 | Kolt ............................ 454/359 |
| 5,206,576 A | 4/1993 | Jaskinski ........................ 320/2 |
| 5,211,371 A | 5/1993 | Coffee ......................... 251/11 |
| 5,258,239 A | 11/1993 | Kobayashi .................... 429/27 |
| 5,304,431 A | 4/1994 | Schumm, Jr. ................. 429/27 |
| 5,325,880 A | 7/1994 | Johnson et al. ................ 137/1 |
| 5,417,235 A | 5/1995 | Wise et al. ..................... 137/1 |
| 5,466,932 A | 11/1995 | Young et al. ................ 250/289 |
| 5,541,016 A | * 7/1996 | Schumm, Jr. ................. 429/27 |
| 5,554,452 A | 9/1996 | Delmolino et al. ........... 429/10 |
| 5,560,999 A | 10/1996 | Pedicini et al. |
| 5,567,114 A | 10/1996 | Wallace ...................... 415/146 |
| 5,571,630 A | * 11/1996 | Cheiky ........................ 429/26 |
| 5,593,134 A | 1/1997 | Steber et al. ........... 251/129.17 |

(List continued on next page.)

FOREIGN PATENT DOCUMENTS

WO    WO 93/23887    11/1993

OTHER PUBLICATIONS

Dynalloy, Inc., "Actuator Wire A Solid State Actuator That Moves by 'Molecular Restructuring'!" Month not available.
Mondo–tronics, Inc. "Using Shape Memory Wires", pp. 2–1 through 2.12, 1–12. Month not available.

*Primary Examiner*—Stephen Kalafut
*Assistant Examiner*—R Alejandro
(74) *Attorney, Agent, or Firm*—Alston & Bird LLP

(57) ABSTRACT

A metal-air cell having a cell casing, an air electrode positioned within the cell casing, and means for providing air to the air electrode when a predetermined load is placed on the cell and for substantially isolating the air electrode when the load is not placed on the cell.

32 Claims, 4 Drawing Sheets

U.S. PATENT DOCUMENTS

| | | | |
|---|---|---|---|
| 5,619,177 A | 4/1997 | Johnson et al. | 337/140 |
| 5,622,482 A | 4/1997 | Lee | 417/321 |
| 5,691,074 A | 11/1997 | Pedicini | 429/27 |
| 5,717,372 A | 2/1998 | Cannon et al. | 335/265 |
| 5,721,064 A * | 2/1998 | Pedicini et al. | 429/27 |
| 5,747,187 A | 5/1998 | Byon | 429/58 |
| 5,800,939 A * | 9/1998 | Mishina et al. | 429/57 |
| 5,837,394 A | 11/1998 | Schumm, Jr. | 429/27 |
| 5,919,582 A * | 7/1999 | Pedicini et al. | 429/27 |
| 6,010,317 A * | 1/2000 | Maget et al. | 417/379 |
| 6,068,944 A * | 5/2000 | Witzigreuter | 429/27 |

* cited by examiner

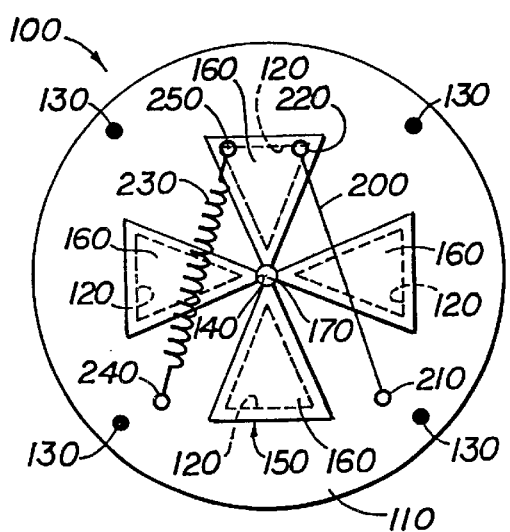
FIG 1
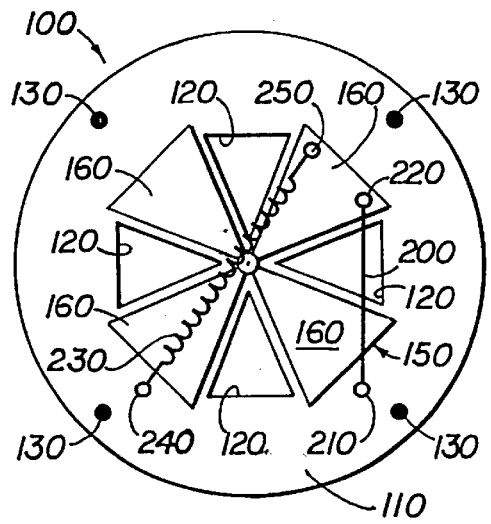
FIG 2
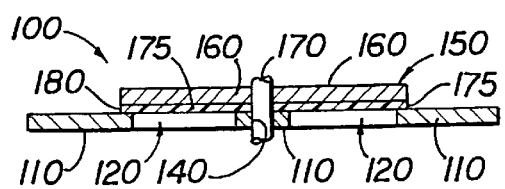
FIG 3
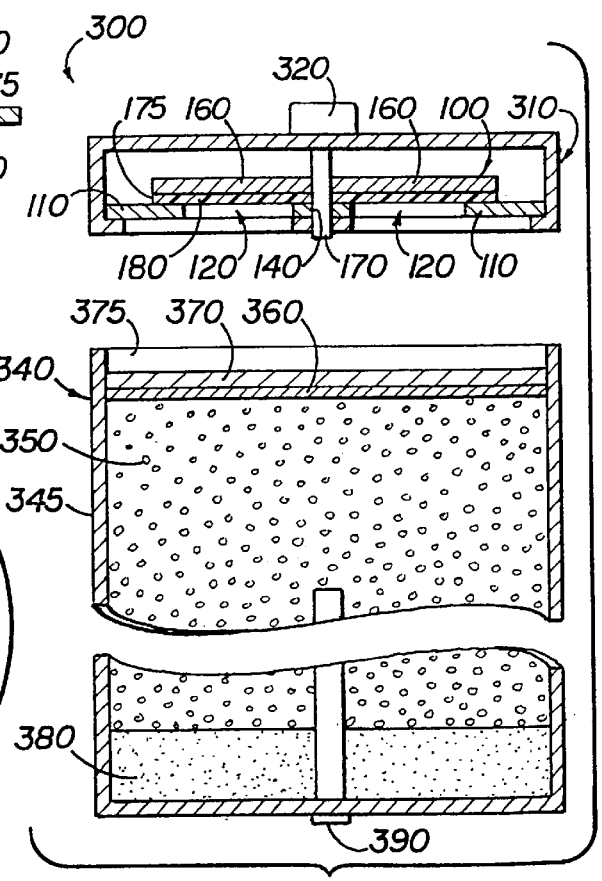
FIG 4
FIG 5

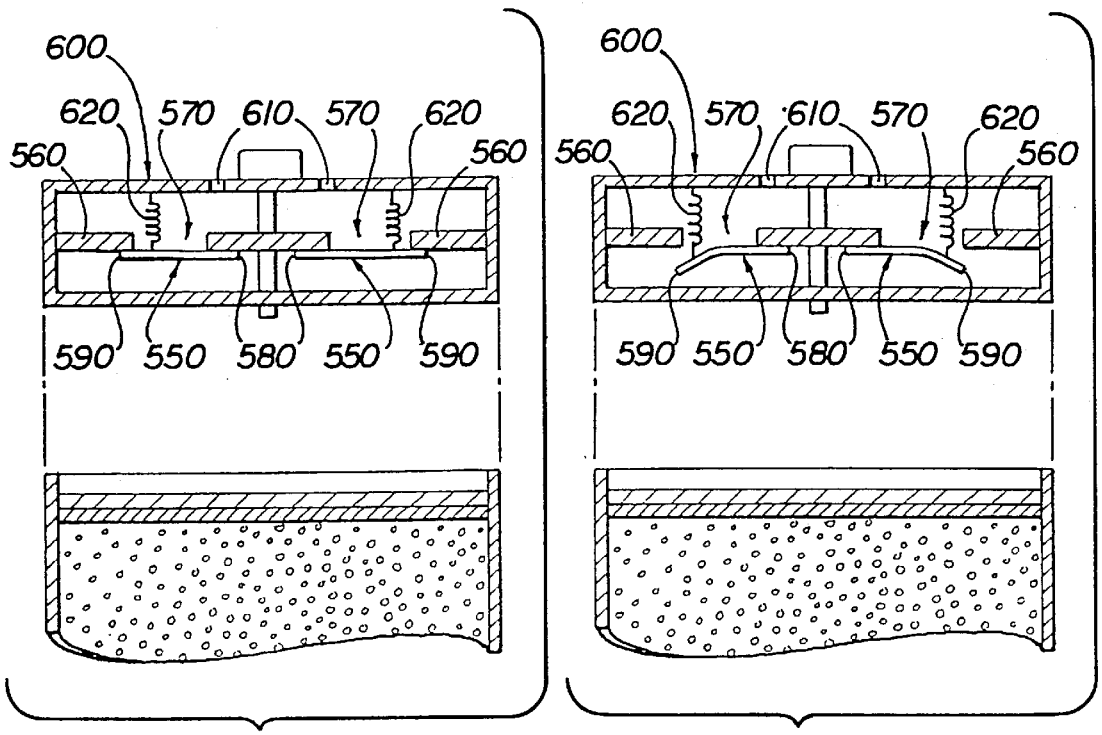
FIG 11
FIG 12
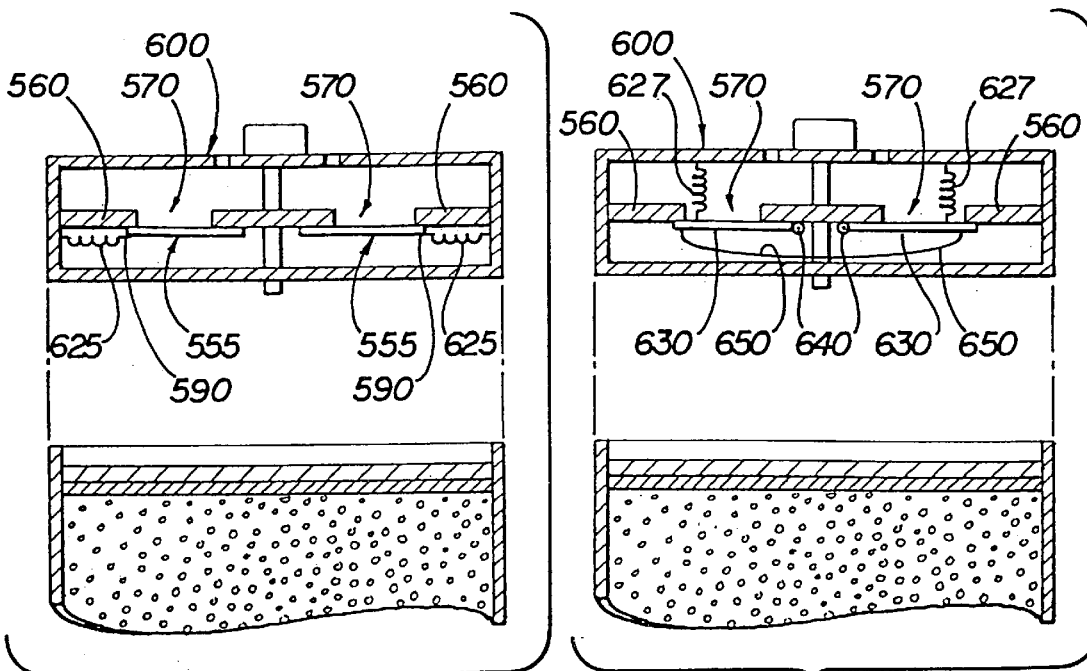
FIG 13
FIG 14

LOAD RESPONSIVE AIR DOOR FOR AN ELECTROCHEMICAL CELL

RELATED APPLICATIONS

The following patent applications for related subject matter,

"CYLINDRICAL METAL-AIR BATTERY WITH A CYLINDRICAL PERIPHERAL AIR CATHODE" Ser. No. 09/215,820, U.S. Pat. No. 6,274,261;

"AIR MANAGER SYSTEMS FOR METAL-AIR BATTERIES UTILIZING A DIAPHRAGM OR BELLOWS" Ser. No. 09/216,026;

"AIR MOVER FOR A METAL-AIR BATTERY UTILIZING A VARIABLE VOLUME ENCLOSURE" Ser. No. 09/216,118;

"DIFFUSION CONTROLLED AIR VENT WITH AN INTERIOR FAN" Ser. No. 09/215,879;

"UNIFORM SHELL FOR A METAL-AIR BATTERY" Ser. No. 09/216,181;

"GEOMETRY CHANGE DIFFUSION TUBE FOR METAL-AIR BATTERIES" Ser. No. 09/216,273;

"AIR-MANAGING SYSTEM FOR METAL-AIR BATTERY USING RESEALABLE SEPTUM" Ser. No. 09/216,343, U.S. Pat. No. 6,168,877

"AIR DELIVERY SYSTEM WITH VOLUME-CHANGEABLE PLENUM OF METAL-AIR BATTERY" Ser. No. 09/216,660;

all of which are incorporated herein by reference, have been filed concurrently with the present application by the assignee of the present application.

TECHNICAL FIELD

The present invention relates to a metal-air power supply and more particularly relates to a metal-air cell or a metal-air battery with a load responsive air door.

BACKGROUND OF THE INVENTION

Generally described, a metal-air cell includes one or more oxygen electrodes separated from a metallic anode by an aqueous electrolyte. A metal-air cell also may include one or more oxygen electrodes that cooperate with metallic anode particles suspended in a paste-like electrolyte. During operation of the metal-air cell, such as a zinc-air cell, oxygen from the ambient air and water from the electrolyte are converted to hydroxide ions at the oxygen electrode. Zinc is oxidized at the anode and reacts with the hydroxide ions. This electrochemical reaction releases water and electrons so as to provide electrical energy.

Metal-air cells have been recognized as a desirable means for powering many types of portable electronic equipment, such as personal computers, camcorders, telephones, and the like. As compared to conventional electrochemical power sources, metal-air cells provide relatively high power output and long lifetime with relatively low weight. These advantages are due in part to the fact that metal-air cells utilize oxygen from the ambient air as the reactant in the electrochemical process as opposed to a heavier material such as a metal or a metallic composition.

One concern in designing metal-air cells is to provide a sufficient amount of oxygen to operate the cells at their desired capacity while also preventing too much oxygen from reaching the cells during periods of non-use. Isolating the cell during periods of non-use minimizes the detrimental impact of humidity, especially while the air moving device is not operational. A metal-air cell that is exposed to ambient air having a high humidity level may absorb too much water through its oxygen electrode and fail due to a condition referred to as "flooding." Alternatively, a metal-air cell that is exposed to ambient air having a low humidity level may release too much water vapor from its electrolyte through the oxygen electrode and fail due to a condition referred to as "drying out."

The transfer of air and water into and out of a metal-air cell can be described in terms of an "isolation ratio." The "isolation ratio" is the rate of the water loss or gain by the cell while its oxygen electrodes are fully exposed to the ambient air as compared to the rate of water loss or gain by the cell while its oxygen electrodes are isolated from the ambient air except through one or more limited openings. For example, given identical metal-air cells having electrolyte solutions of approximately thirty-five percent (35%) KOH in water, an internal relative humidity level of approximately fifty percent (50%), ambient air having a relative humidity level of approximately ten percent (10%), and no fan-forced circulation, the water loss from a cell having an oxygen electrode fully exposed to the ambient air is compared to a similar cell positioned within a housing with limited air access. An isolation ratio of over a hundred (100) to one (1) may be expected depending upon the design of the housing.

Isolating the cells during periods of non-use also minimizes the self-discharge and leakage or drain current. Self-discharge can be characterized as a chemical reaction within a metal-air cell that does not provide a usable electric current. Self-discharge diminishes the capacity of the metal-air cell to provide a usable electric current. Self-discharge occurs, for example, when a metal-air cell dries out and the zinc anode of oxidized by the oxygen that seeps into the cell during periods of non-use. Leakage current, which is synonymous with drain current, can be characterized as the electric current that can be supplied to a closed circuit by a metal-air cell when air is not provided to the cell by an air moving device.

One drawback with the current design of metal-air cells is that the cells tend to be somewhat larger in size than conventional electrochemical power sources. This size constraint is caused, in part, by the requirements of having a metallic electrode, an air electrode, an electrolyte, a cell casing of some sort, and an air manager or an air passageway of some sort to provide the reactant air to the cell. These elements all take up a certain amount of valuable space that could be used for the battery chemistry.

For example, a multiple cell metal-air battery pack housing traditionally has at least one air inlet passageway and at least one air outlet passageway positioned adjacent to an interior fan. The air passageways are generally sealed with mechanical air doors to prevent the transfer of air and humidity into or out of the housing during periods of non-use. An example of a mechanical air door system is shown in U.S. Pat. No. 4,913,983 to Chieky. This reference describes the use of a fan to supply a flow of ambient air to a pack of metal-air cells within the battery housing. When the battery pack is turned on, the mechanical air doors adjacent to an air inlet and an air outlet are opened and the fan is activated to create the flow of air into, through, and out of the housing. The air doors are then closed when the battery is turned off to isolate the cells from the environment. Although the mechanical air doors may limit the transfer of oxygen, water vapor, and contaminates into and out of the housing, such mechanical air doors add complexity to the battery housing itself and, inevitably, increase the size and cost of the overall battery pack.

Further, the air moving devices, such as the fan used in Chieky, are generally bulky and expensive relative to the volume and cost of the metal-air cells. Although a key advantage of metal-air cells is the high energy density resulting from the low weight of the oxygen electrode, this advantage is compromised by the space, weight, and power required by an effective air-moving device. Space that otherwise could be used for battery chemistry to prolong the life of the battery must be used to accommodate an air-moving device. Likewise, the fan also draws a certain amount of power to operate. This loss of space and power can be critical to attempts to provide a practical metal-air cell in a small enclosure such as the typical "AA" cylindrical size now used as the standard in many electronic devices.

There is a need, therefore, for a metal-air cell and/or battery pack that is as small and compact as possible, that maximizes the volume available for battery chemistry, and that provides adequate power with an adequate isolation ratio. These advantages must be accomplished in a metal-air cell or battery pack that provides the traditional power and lifetime capabilities of a metal-air cell in a low cost, efficient manner.

SUMMARY OF THE INVENTION

The present invention is directed towards a passive, load responsive air valve for a metal-air cell or battery. Advantageously, the present invention thus provides air access to the air electrode of a metal-air cell based upon the operating conditions of the cell. By creating air access in response to the load conditions on the cell, such as the internal current or the internal pressure, the present invention provide reactant air to the cell without the need for an air mover or an air manager with its own control system. Rather, the present invention uses devices such as shape memory alloy elements, bi-metal elements, diaphragms, and the like to provide mechanical action without the use of electronic control systems.

One embodiment of the present invention includes the use of a metal-air cell having a cell casing, an air electrode positioned within the cell casing, and means for providing air to the air electrode when a predetermined load is placed on the cell and for substantially isolating the air electrode when the load is not placed on the cell. The metal-air cell further includes a negative terminal in communication with a metallic zinc anode and a positive terminal in communication with the air electrode. The air providing means is positioned adjacent to the cell casing and in proximity to the air electrode.

The cell casing includes a disk with one or more air apertures positioned adjacent to the air electrode. An air door is positioned on the disk adjacent to the air apertures. The air door is sized to cover substantially the air apertures. The air door may include one or more air shutters rotating about a central hub. A shape memory alloy wire is connected to the disk and to one of the air shutters. The shape memory alloy wire completes a circuit between the positive terminal and the negative terminal. When a load is applied to the cell, the circuit warms the shape memory alloy wire. The shape memory alloy wire therefore rotates the air shutters to expose the air electrode to the ambient air. A spring is also connected to the disk and to the air shutter. When the load is removed, the spring rotates the air shutter back so as to cover substantially the air aperture.

In another embodiment, the air door includes a shape memory-alloy plate. The plate completes a circuit between the positive terminal and the negative terminal. When a load is applied to the cell, the circuit warms the plate. The plate therefore changes shape so as to expose the air electrode to the ambient air. A spring also may be connected to the cell casing and to the plate. The spring forces the plate back so as to cover substantially the air aperture when the load is removed from the cell. A plurality of shape memory alloy plates and a plurality of springs may be used.

In another embodiment, the air door includes a pair of air shutters. Each of the air shutters is connected to the disk by a hinge. A shape memory alloy wire is connected to each of the pair of air shutters. When a load is applied to the cell, the circuit warms the wire such that the wire opens the air shutters to expose the air cathode to the ambient air. A pair of springs is connected to the air shutters. The springs force the air shutters back so as to cover substantially the air aperture when the load is removed from the cell.

In another embodiment, the air door includes a bi-metal element. The bi-metal element is placed in a circuit between the positive terminal and the negative terminal. The bi-metal element moves to expose the air electrode to the ambient air when a load is applied to the metal-air cell. The bi-metal element may be a bi-metal strip or a bi-metal spiral.

In a further embodiment, the metal-air cell includes an air plenum positioned adjacent to the air electrode. The means for providing air to the air electrode when a predetermined load is placed on the metal-air cell and for substantially isolating the air electrode when the load is not placed on the metal-air cell include a diaphragm. The diaphragm may include an air aperture therein. As a load is applied to the metal-air cell, a partial vacuum builds within the air plenum. The partial vacuum causes the diaphragm to expand and air to pass through the air aperture until the partial vacuum dissipates. A plurality of air apertures or isolating air apertures may be used. A spring also may be attached to the diaphragm. The spring may force the diaphragm to contract after the partial vacuum has dissipated.

In a further embodiment, the diaphragm includes a central aperture substantially covered by a disk. A spring is attached to the disk. As a load is applied to the metal-air cell, a partial vacuum builds within the air plenum and causes the disk to pull away from the diaphragm. Air passes through the central aperture until the partial vacuum dissipates. The spring then forces the disk back to cover substantially the central aperture.

In another embodiment, the metal-air cell includes an air electrode, a metallic anode, a negative terminal, a positive terminal, a cell casing, and a passive air manager. The passive air manager includes an air door positioned adjacent to the cell casing in proximity with the air electrode. The air door is positioned in a circuit between the negative terminal and the positive terminal of the cell. The air door changes its shape when the current running through the circuit reaches a predetermined amount, thereby exposing the air electrode to the ambient air. A plurality of air doors may be used. The air doors may use a shape memory alloy element, a bi-metal element, a diaphragm, or similar devices.

In another embodiment, the passive air manager includes one or more air doors positioned adjacent to the cell casing in proximity with the air electrode. An air door actuator is attached to the air doors. The air door actuator is positioned in a circuit between the negative terminal and the positive terminal of the cell such that the air door actuator opens the air doors when the current running through the circuit reaches a predetermined amount. The air door actuator may be a shape memory alloy element or a similar device.

In another embodiment, the passive air manager includes a diaphragm positioned adjacent to the cell casing in proximity to the air electrode. The diaphragm includes an air aperture positioned therein. When a load is applied to the metal-air cell, a partial vacuum builds within the air plenum that causes the diaphragm to expand. Air then pass through the air aperture until the partial vacuum dissipates. A plurality of air apertures or isolating air apertures may be used. A spring may be attached to the diaphragm. The spring forces the diaphragm to contract after the partial vacuum has dissipated.

In another embodiment, the air aperture includes a central aperture substantially covered by a disk. A spring is attached to the disk. As a load is applied to the metal-air cell, a partial vacuum builds within the air plenum. The partial vacuum causes the disk to pull away from the diaphragm and air to pass through the central aperture until the partial vacuum dissipates. The spring then forces the disk back to cover substantially the central aperture.

Other objects, features, and advantages of the present invention will become apparent upon review of the following detailed description of the preferred embodiments of the invention, when taken in conjunction with the drawings and the appended claims.

BRIEF DESCRIPTION OF THE DRAWINGS

FIG. 1 is a plan view of the air valve of the present invention with the air door closed.

FIG. 2 is a plan view of the air valve of the present invention with the air door open.

FIG. 3 is a side cross-sectional view of the air valve of FIG. 1.

FIG. 4 is a plan view of an air cap.

FIG. 5 is a side cross-sectional view of an AA sized metal-air cell using an air valve of the present invention.

FIG. 11 is a side cross-sectional view of a metal-air cell with an air valve having shape memory alloy strips.

FIG. 12 is a side cross-sectional view of a metal-air cell with an air valve having shape memory alloy strips.

FIG. 13 is a side cross-sectional view of a metal-air cell with an air valve having shape memory alloy strips.

FIG. 14 is a side cross-sectional view of a metal-air cell with an air valve having a hinge mounted air doors connected by a shape memory alloy wire.

DETAILED DESCRIPTION OF THE INVENTION

Figure 6:
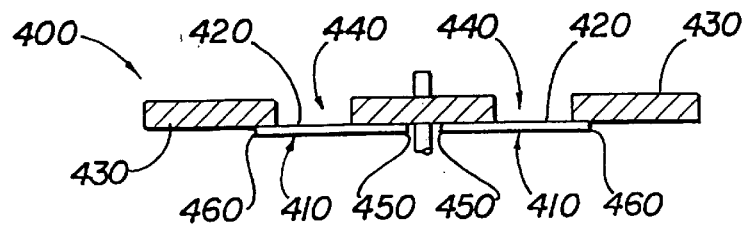
FIG. 6 is a side cross-sectional view of an air valve of the present invention using bi-metal strips in the closed position.

Referring now in more detail to the drawings, in which like numerals refer to like parts throughout the several views, FIGS. 1–5 show a first embodiment of a passive air valve 100 of the present invention. By the term "passive" air valve, we mean that the air valve 100 allows air access to a metal-air cell or battery in response to the operating conditions of the cell, such as the load, the current, the temperature, the internal pressure, etc., as opposed to an independently activated air manager system with its own control systems.

The air valve 100 includes a disk 110 positioned adjacent to an air electrode of a metal-air cell. The disk 110 is preferably a stamped metal element made from a nickel-plated steel or similar materials. Alternatively, any other conventional, conductive, substantially non-air permeable material can be used. The disk 110 includes a plurality of air apertures 120, a plurality of open cell voltage holes 130, and a central aperture 140. The air apertures 120 are shown in phantom lines in FIG. 1. The size and the number of the air apertures 120 depend upon the size of the battery as a whole and its load requirements. The total open area of the air apertures 120 should be approximately ten percent (10%) to about thirty percent (30%) of the area of the disk 110. Likewise, the open cell voltage holes 130 are sized to permit a sufficient amount of oxygen to diffuse through the disk 110 when no load is applied such that the cell maintains a consistent open cell voltage. This voltage minimizes any delay that may occur when the cell transitions from a low or no current demand state to a maximum output current state. The open cell voltage holes 130 may have a total open area of about one percent (1%) of the area of the disk 110.

Positioned over the air apertures 120 is an air door 150. The air door 150 includes a plurality of air shutters 160. The air shutters 160 are positioned and sized so as to cover completely each respective air aperture 120. The air shutters 160 are joined at a common hub 140 The hub 140 extends through the central disk aperture 140. A sufficient amount of space exists between each air shutter 160 such that the air apertures 120 are at least partially unobstructed when the air door 150 rotates about the hub 140. The air door 150 is preferably made from a stamped metal similar to that of the disk 110. Alternatively, any similar conductive, substantially non-air permeable material may be used.

As is shown in FIGS. 3 and 5, positioned between the air shutter 150 and the disk 110 is a spacer 170. The spacer 170 is substantially the same size and shape as the air shutters 150 and has a plurality of spacer arms 175 corresponding to the plurality of air shutters 160. The spacer arms 175 are fixedly attached to the air shutters 160 by gluing or other conventional means. The spacer 170 substantially seals the air apertures 120 of the disk 110. The spacer 170 may be made from polytetrafluoroethylene (Teflon) or similar materials so as to insulate the air apertures 120 of the disk 110 and the air door 150. Further, a relatively constant viscosity silicone lubricant or similar material may be used between the disk 110 and the air door 150 to ensure air tight sealing.

Mounted onto the disk 110 is a shape memory alloy ("SMA") wire 200. The SMA wire 200 is mounted onto the disk 110 at a first pin 210 and also onto one of the air shutters 160 at second pin 220. By "Shape Memory Alloy Wire" 200, we mean a wire, generally nitinol alloys with nearly equal atomic amounts of nickel and titanium, that is made to "remember" a particular shape. Such a SMA wire 200 is formed at low temperatures to the desired shape, clamped, and then heated past its transformation temperature to its annealed temperature. The SMA wire 200 can be easily deformed when cooled. Thereafter, the wire 200 will return to its annealed shape when heated. After the heat source is removed, the wire 200 can be forced back to its deformed shape and the cycle can be repeated. A SMA wire 200 can thus provide mechanical movement without the use of traditional motor. A preferred SMA wire 200 is sold by Dynalloy, Inc. of Erin, Calif. under the trademark "Flexinol" actuator wires.

In the present case, the SMA wire 200 is formed with an annealed shape having a given length. The SMA wire 200 is deformed by stretching a given amount and then attached to the pins 210, 220. The SMA wire 200 is connected to the load on the metal-air cell 300 such that when an electrical current, heat, or other type of energy is applied to the deformed SMA wire 200, the wire 200 returns to its non-deformed or annealed shape and rotates the air shutters 160. Also attached to the disk 110 is a spring 230. The spring 230 is attached to the disk 110 by a third pin 240 and attached to the air shutter 160 by a fourth pin 250. The spring 230 is in its relaxed state when the air shutters 160 cover and close the air apertures 120. After the SMA wire 200 rotates the air shutters 160 to their open position, the spring 230 forces the air shutters 160 to rotate back to their closed position when the load has been removed from the cell.

FIGS. 4 and 5 show the application of the air valve 100 in an "AA" size cell 300. The AA cell 300 includes the air valve 100 enclosed within an air cap 310. The air cap 310 includes a positive cell terminal 320 surrounded by a plurality of cap openings 330. The cap openings 330 are similar in size and number to the air apertures 120 and generally remain exposed to the ambient air. The size of the cap openings 330 also depends upon the size and power requirements of the cell 300. The cell 300 further includes a chemistry body 340 for mating with the air cap 310. The chemistry body 340 includes a cell casing 345. Positioned within the cell casing 340 may be a zinc paste anode material 350, a separator layer 360, an air electrode or a cathode layer 370, and an air plenum 375. The zinc paste anode material 350, the separator layer 360, the cathode layer 370, and the air plenum 375 are of conventional design. The positive cell terminal 320 and the cathode layer 370 may be in electrical communication via the hub 140 or by other connection means. The zinc paste anode material 350 is kept in contact with the separator layer 360 via a compressible open cell foam 380, a spring-loaded gantry, or by other types of conventional compressible elements to maintain a mechanical interface with the zinc paste 350. The chemistry body 340 also includes a negative cell terminal 390 in electrical communication with the zinc past anode material 350.

In use, the SMA wire 200 is connected in a circuit to the negative terminal 390 or to the zinc paste anode material 350 on one end and to the air shutter 160 on the other. The air shutter 160 also is connected in a circuit to the cathode layer 370 via the hub 140. With no load on the cell 300, the cell 300 may have a current capability of approximately one (1) to five (5) milliamps due to the oxygen allowed through the open cell voltage holes 130. The SMA wire 200 will not alter its shape in the presence of this amount of current. As the load on the cell 300 increases, the current flowing through the SMA wire 200 also increases. This increase in current causes an increase in temperature. The SMA wire 200 thus returns to its non-deformed or annealed shape. For example, the SMA wire 200 may return to its non-deformed or annealed shape when the current is greater than approximately 0.060 to 1.00 amp. The SMA wire 200 may shorten in length by about three (3) to five (5) percent. This movement causes the air shutter 160 to rotate about the hub 140 and leaves the air apertures 120 and the cathode layer 370 exposed to the ambient air. The effective open area of the cathode layer 370 thus expands from less than about 0.10 percent to greater than about ten percent (10%).

When the load on the metal-air cell 300 is removed, the current through the SMA wire 200 also ceases and the SMA wire 200 cools. The spring 230 therefore forces the air shutters 160 to rotate back about the hub 140 such that the air apertures 120 are again covered and substantially sealed. This rotation of the air shutters 160 also causes the SMA wire 200 to stretch back to its original deformed shape.

Specifically, the cell 300 may be about 0.5 inches in diameter and about 1.8 inches in length. The air plenum 375 may be about 0.5 to about 0.3 inches in depth. The cell 300 may have about 0.4 cubic inches of the zinc paste anode material 350 and provide about 9 amp/hours. The power output may be about 200 milliwatts. Further, similar cells with other sizes may be used. A similar cell in a conventional "D" size cell may provide about 40 amp/hours with a power output of about 800 milliwatts. Likewise, the embodiment of the metal-air cell 300 with the zinc paste anode material 350 is by way of example only. Other types of conventional metal-air cells 300 may be used. By way of example, a dual air electrode cell also may be used with the zinc paste anode material 350. Similarly, a metallic cylindrical electrode or plate electrode also may be used in place of the zinc paste anode material 350.

Figure 7:
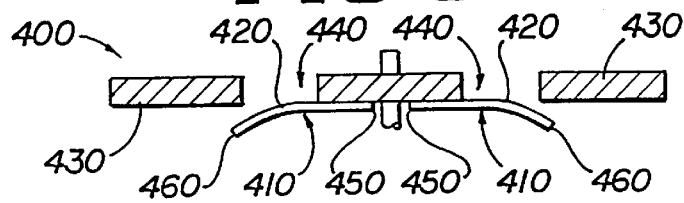
FIG. 7 is a side cross-sectional view of an air valve of the present invention using bi-metal strips in the open position.
Figure 8:
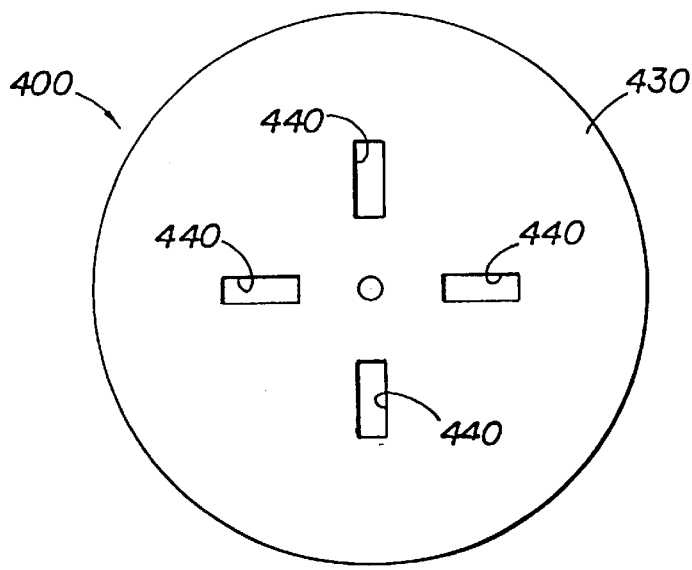
FIG. 8 is a plan view of an air cap.

FIGS. 6 through 8 show a further embodiment of the present invention. As with the first embodiment of the present invention, the embodiment of FIGS. 6 through 8 uses the current flowing through a metal-air cell when a load is applied to open and close an air passageway to the air electrode. These figures show a passive air valve 400. The air valve 400 uses one or more bi-metal elements 410. As is well known, a bi-metal element generally has two layers of dissimilar metals bonded together. These metals have different coefficients of thermal expansions and therefor undergo different increases in length upon heating. In this embodiment, a plurality of bi-metal rectangular strips 420 is used, although any shape may be employed. Preferred bi-metal strips are sold by both GTE and Hood Bi-Metals.

The bi-metal strips 420 are fixedly attached to a disk 430. As in the previous embodiment, the disk 430 is positioned adjacent to an air electrode of a metal-air cell with an air plenum between the electrode and the disk. The cell may be identical to the cell 300 described above or any conventional metal-air cell. The disk 430 may be made of the same materials as the disk 110 described above. The disk 430 has several air apertures 440. The size and number of the air apertures 440 depend upon the size of the cell as a whole and its load requirements. The bi-metal strips 420 and the air apertures 440 are sized such that each bi-metal strip 420 is positioned within or adjacent to each air aperture 440 and substantially seals each air aperture 440. Each bi-metal strip 420 is fixedly attached to the disk 430 at a first end 450 by soldering, pins, or other conventional fastening means. A second end 460 of the bi-metal strip 420 is not attached.

The bi-metal strip 420 is wired in the circuit between the positive and negative cell terminals of the cell. When a load is applied to the cell, the current flowing through the bi-metal strip 420 causes the temperature of the bi-metal strip 420 to rise. As the temperature rises, one of the elements of the bi-metal strip 420 expands more than the other. This expansion causes the unattached second end 460 of the bi-metal strip 420 to curve or snap inward towards the air electrode. As the second end 460 of the bi-metal strip 420 curves away from its respective air aperture 440, the air electrode is exposed to the ambient air. When the load is removed from the cell, the bi-metal strip 420 cools. The second end 460 of the bi-metal strip 420 then returns to its original shape and substantially seals the respective air aperture 440.

Figure 9:
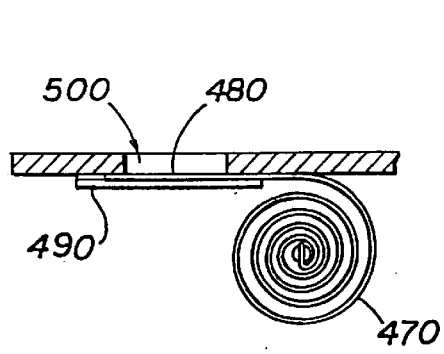
FIG. 9 is a side cross-sectional view of an air valve of the present invention using a bi-metal spiral.
Figure 10:
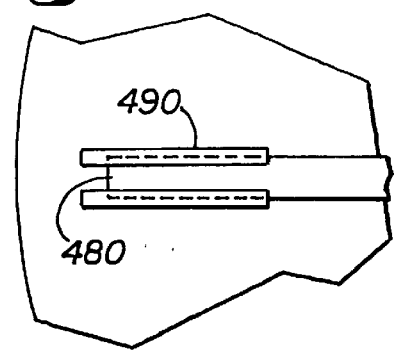
FIG. 10 is a plan view of the bottom of an air cap with one end of the bi-metal spiral within a track.

FIGS. 9 and 10 show a similar embodiment using one or more bi-metal spirals 470 rather than the bi-metal strip 420. One end 480 of the spiral 470 is placed within a track 490 adjacent to an air aperture 500 of a disk 510. The spiral 470 is placed within the circuit of the cell. When the spiral 470 is cool, the end 480 of the spiral 470 substantially fills and seals the air aperture 500. When a load is applied to the cell and the spiral 470 is heated, the spiral 470 changes shape and causes the end 480 of the spiral 470 to move within the track 490. The end 480 opens the air aperture 500 such that the air electrode is again exposed to the ambient air. The end 480 of the spiral 470 then returns to its original position when the spiral 470 cools.

FIGS. 11 through 12 show a further embodiment of the present invention. This embodiment uses a SMA plate 550 in a manner similar to the use of the bi-metal elements 410. The SMA plate 550 has an annealed shape that is slightly curved. The SMA plate 550 is then deformed to a substantially planar shape. This embodiment also uses a disk 560 with a plurality of air apertures 570. The SMA plate 550 has a first end 580 fixedly attached to the disk 560 and an unattached second end 590. The SMA plate 550 is placed within the circuit of the cell. The disk 560 and the SMA plates 550 are positioned within an air cap 600. The air cap 600 is similar to the air cap 310 described above and has a plurality of cap openings 610. Also connected to the air cap 600 is a plurality of springs 620. Each spring 620 is attached to the air cap 600 and to one of the SMA plates 550.

In use, the SMA plate 550 is heated as the load on the cell increases. This heating causes the SMA plate 550 to returned to its curved annealed shape. As the SMA plate 550 curves, the air apertures 570 are opened such that the air electrode is exposed to the ambient air. When the load is removed from the cell and the SMA plate 570 returns to its normal temperature, the spring 620 forces the second end 590 of the SMA plate 550 back to its original, closed position.

A similar embodiment is shown in FIG. 13. This embodiment is identical to that of FIGS. 11 and 12, with the exception that this SMA plate 555 has an annealed shape of a given length. The SMA plate 555 is then deformed by stretching a predetermined amount. When a load is applied and the SMA plate 555 is heated, the plate 555 returns to its shorter annealed shape. This reduction in length also opens the air apertures 570 such that the air electrodes are exposed. This embodiment also has a plurality of springs 625. In this case, the springs 625 are attached to the sides of the air cap 600 such that the springs 625 force the SMA plate 555 back to its deformed length when the load is removed from the cell and the plate 555 returns to its normal temperature.

A further embodiment is shown in FIG. 14. This embodiment also uses the disk 560 with the apertures 570 and the air cap 600 as is shown in FIGS. 11 and 12. In this case, however, the apertures 570 are sealed by the air doors 630 that rotate about spring mounted hinges 640. Positioned between each pair of air doors 630 is an SMA wire 650 with an annealed shape having a given length. The SMA wire 650 is then stretched and attached to the air doors 630. When a load is applied to the cell and the SMA wire 650 is heated, the wire 650 contracts and causes the air doors 630 to open. After the load is removed from the cell and the SMA wire 650 cools, either the spring mounted hinges 640 or a separate pair of springs 627 forces the air doors 630 shut and stretches the SMA wire 650 back to its deformed shape.

Figure 15:
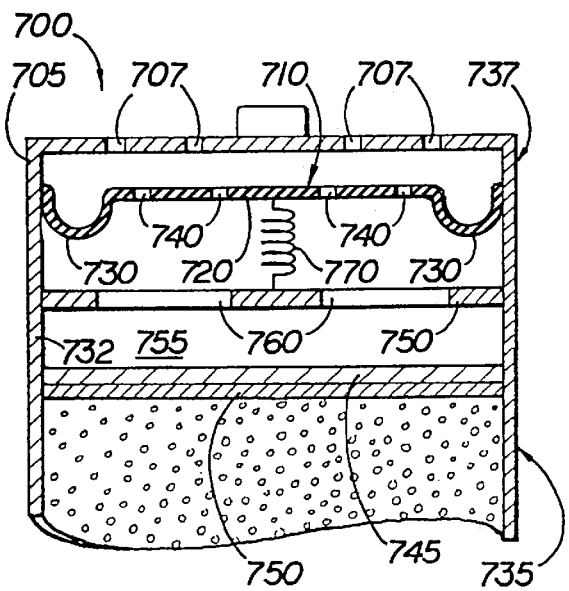
FIG. 15 is a side cross-sectional view of a metal-air cell with an air valve having a diaphragm and a spring mounted on a support structure.

FIG. 15 shows a further embodiment of the present invention. This figures shows an air valve 700. The air valve 700 uses air pressure created within a metal-air cell when a load is applied to open and close an air passageway to the air electrode. The air valve 700 includes an upper cap 705 with an internal diaphragm 710. The upper cap 705 may have a plurality of air holes 707 therein. The diaphragm 710 generally includes a central section 720 and an annular hinge section 730 having a "U" shaped cross section. The annular hinge 730 is attached to the wall 732 of a metal-air cell 735. The diaphragm 710 is preferably made from an elastomeric polymer or rubber. The diaphragm 710 also contains a plurality of air holes 740 within the central section 720. The size and number of the air holes 707, 740 depend upon the size of the cell as a whole and its load requirements. The air holes 707 of the upper cap 705 and the air holes 740 of the diaphragm 710 are not aligned. In its relaxed state, the central section 720 of the diaphragm 710 is positioned against the upper cap 705. Because the air holes 707, 740 are not aligned, the air valve 700 is substantially sealed in this position.

Positioned between the diaphragm 710 and an air electrode 745 of the cell 735 is a support partition 750. The support partition 750 is positioned within an air plenum 755 of the cell 735. The support partition 750 has a plurality of large air apertures 760 so as to permit unrestricted airflow between the diaphragm 710 and the air electrode 745. Mounted on the support partition 750 are one or more springs 770. The spring 770 is connected between the support partition 750 and the diaphragm 710.

In use, as a load is applied to the cell 735, a partial vacuum builds between the air electrode 745 and the diaphragm 710 as the air electrode 745 consumes the available oxygen. This partial vacuum causes the diaphragm 710 to expand in against the spring 770 and leaves the air holes 707, 740 open to the ambient air. The partial vacuum forces ambient air through the air holes 707, 740 to the air plenum 755 and the air electrode 745. As the ambient air fills the air plenum 755, the partial vacuum is relieved and the spring 770 forces the diaphragm 710 back to its original position. Once the diaphragm 710 is back in its original position, the partial vacuum again builds and repeats the cycle as described above. This cycling action essentially creates a pumping action forcing ambient air into the cell 735 without the use of electronic parts. Depending upon the elastic nature of the material used for the diaphragm 710, the spring 770 may not be needed.

For example, if the cell 735 is AA size, the typical cell leakage rate may be about one (1) milliamp. The diaphragm 710 will remain in its essentially closed positioned at this load. Loads higher than this, however, will cause the diaphragm 710 to open. The diaphragm 710 may "open," i.e., expand downward once the partial pressure reaches about 0.5 psi. Ambient air will then rush into the air plenum 755 before the diaphragm 710 "closes," i.e., returns to its relaxed state.

Figure 16:
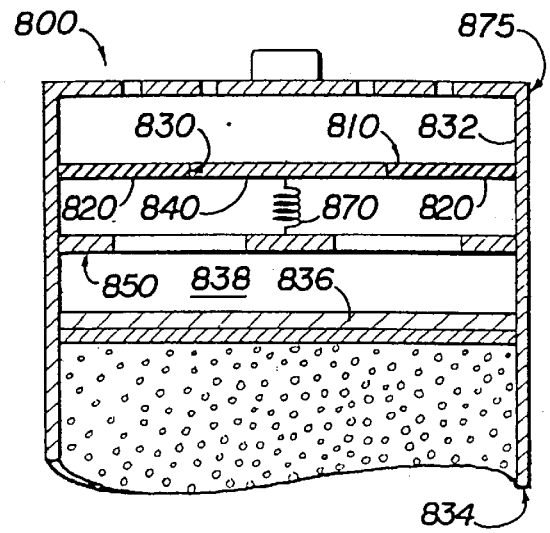
FIG. 16 is a side cross-sectional view of a metal-air cell with an air valve having a diaphragm with a central disk and a spring mounted on a support structure.
Figure 17:
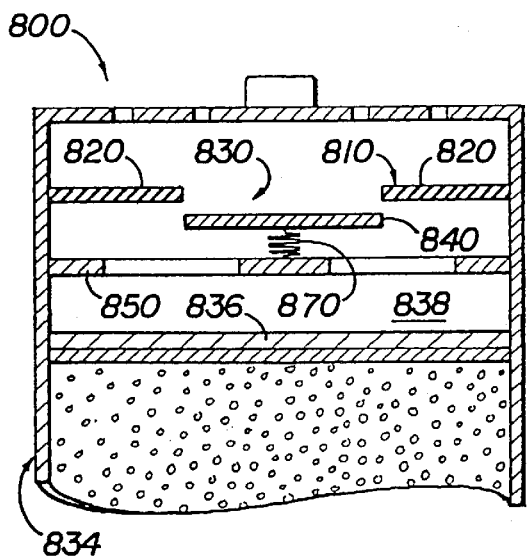
FIG. 17 is a side cross-sectional view of a metal-air cell with an air valve having a diaphragm with a central disk and a spring mounted on a support structure.

FIGS. 16 and 17 show a further embodiment of the present invention. This embodiment uses an air valve 800. The air valve 800 has a diaphragm 810 with a rigid outer section 820 and central aperture 830. The central aperture 830 is filled with a disk 840. When placed in the central aperture 830, the disk 840 substantially fills and seals the central aperture 830. The diaphragm 810 is fixedly attached to the walls 832 of a metal-air cell 834 near the air electrode 836 and the air plenum 838 as described above. Positioned between the diaphragm 810 and the air electrode 836 is a support partition 850 with a plurality of large air holes 860 so as to allow unrestricted air flow between the diaphragm 810 and the air electrode 836. Positioned on the support partition 850 are one or more springs 870. The springs 870 are positioned between the support partition 850 and the disk 840.

With no load or only a leakage load present, the springs 870 keep the disk 840 within the central aperture 830 such that the diaphragm 810 is substantially sealed. When a load is applied to the cell 834, a partial vacuum builds within the air plenum 838 as described in detail above. This partial vacuum causes the springs 870 to buckle or to compress such that the disk 840 is forced into the air plenum 838. The central aperture 830 is then unsealed such that the ambient air is forced into the air plenum 838 and to the air electrode 836. Once the ambient air reaches the air plenum 838, the partial vacuum is reduced and the springs 870 snap the disk 840 back into place within the central aperture 830. The air valve 800 thus also creates a pumping action as described above.

Figure 18:
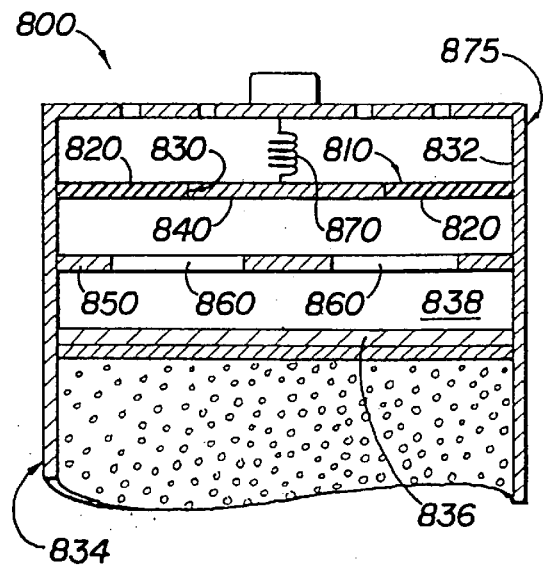
FIG. 18 is a side cross-sectional view of a metal-air cell with an air valve having a diaphragm with a central disk and a spring mounted on the air cap.

A further alternative embodiment is shown in FIG. 18. In this embodiment, the springs 870 may be mounted within an air cap 875 similar to the air cap 310 described above. The spring 870 would therefore be placed on the other side of the diaphragm 810 such that the partial vacuum pulls the disk 840 into the air plenum 838.

From the foregoing description of the preferred embodiments and the several alternatives, other alternative constructions of the present invention may suggest themselves to those skilled in the art. Therefore, the scope of the present invention is to be limited only by the claims below and the equivalents thereof

What is claimed is:

1. An electrochemical cell comprising;
   an air electrode;
   an air plenum;
   a cell casing;
   a diaphragm positioned adjacent to said cell casing, said diaphragm comprising an air aperture positioned therein, such that when a load is applied to said electrochemical cell, a partial vacuum builds within said air plenum, and said partial vacuum causes said diaphragm to expand and air to pass through said air aperture so that said partial vacuum dissipates.

2. The electrochemical cell of claim 1, wherein said air aperture comprises a plurality of air apertures.

3. The electrochemical cell of claim 1, wherein said air aperture comprises a plurality of isolating air apertures.

4. The electrochemical cell of claim 1, wherein said cell casing further comprises a spring attached to said diaphragm, such that said spring forces said diaphragm to contract after said partial vacuum has dissipated.

5. The electrochemical cell of claim 1, wherein said air aperture comprises a central aperture and wherein said central aperture comprises a disk substantially covering said central aperture.

6. The electrochemical cell of claim 5, herein said cell casing comprises a spring, said spring is attached to said disk such that when a load is applied to said electrochemical cell, a partial vacuum builds within said air plenum, and said partial vacuum causes said disk to pull away from said diaphragm and air to pass through said central aperture.

7. The electrochemical cell of claim 6, wherein said spring forces said disk to cover substantially said central aperture when said partial vacuum dissipates.

8. An electrochemical cell, comprising:
   a cell casing;
   an air electrode positioned within said cell casing;
   said cell casing comprising a disk positioned adjacent to said air electrode, wherein said disk comprises an air aperture therein, and wherein said air aperture comprises one or more air apertures;
   a negative terminal in communication with a metallic zinc anode and a positive terminal, in communication with said air electrode; and
   load responsive means for providing air to said air electrode in response to a predetermined load being placed on said electrochemical cell and for substantially isolating said air electrode in response to said load not being placed on said electrochemical cell, wherein said load responsive means comprises an air door positioned on said disk and adjacent to said air aperture.

9. The electrochemical cell of claim 8, wherein said air door is sized to cover substantially said air aperture.

10. The electrochemical cell of claim 8, wherein said air door comprises one or more air shutters rotating about a central hub.

11. The electrochemical cell of claim 10, wherein said load responsive means comprises a shape memory alloy wire connected to said disk and to one of said one or more air shutters.

12. The electrochemical cell of claim 11, wherein said shape memory alloy wire comprises a circuit between said positive terminal and said negative terminal such that when a load is applied to said electrochemical cell, said circuit warms said shape memory alloy wire and said shape memory alloy wire rotates said one or more air shutters to expose said air electrode to the ambient air.

13. The electrochemical cell of claim 12, wherein said load responsive means comprises a spring connected to said disk and to said one of said one or more air shutters such that when said load is removed from said electrochemical cell said spring rotates said one or more air shutters back to cover substantially said air aperture.

14. The electrochemical cell of claim 9, wherein said air door comprises a shape memory alloy plate.

15. The electrochemical cell of claim 14, wherein said shape memory alloy plate comprises a circuit between said positive terminal and said negative terminal such that when a load is applied to said electrochemical cell, said circuit warms said shape memory alloy plate and said shape memory alloy plate changes shape to expose said air electrode to the ambient air.

16. The electrochemical cell of claim 15, wherein said load responsive means comprises a spring connected to said cell casing and to said shape memory alloy plate such that when said load is removed from said electrochemical cell said spring forces said shape memory alloy plate back to cover substantially said air aperture.

17. The electrochemical cell of claim 16, wherein said shape, memory alloy plate comprises a plurality of shape memory alloy plates and wherein said spring comprises a plurality of springs.

18. The electrochemical cell of claim 9, wherein said air door comprises a pair of air shutters, each of said air shutters connected to said disk by a hinge.

19. The electrochemical cell of claim 18, wherein said load responsive means comprises a shape memory alloy wire connected to each of said pair of air shutters.

20. The electrochemical cell of claim 19, wherein said shape memory alloy wire comprises a circuit between said positive terminal and said negative terminal such that when a load is applied to said electrochemical cell, said circuit warms said shape memory alloy wire and said shape memory alloy wire opens said pair of air shutters to expose said air electrode to the ambient air.

21. The electrochemical cell of claim 20, wherein said load responsive means comprises a pair of springs connected to said pair of air shutters such that when said load is removed from said electrochemical cell said pair of springs forces said pair of air shutters back to cover substantially said air aperture.

22. The electrochemical cell of claim 9, wherein said air door comprises a bi-metal element.

23. The electrochemical cell of claim 22, wherein said bi-metal element comprises a circuit between said positive terminal and said negative terminal such that when a load is applied to said electrochemical cell, said bi-metal element moves to expose said air electrode to the ambient air.

24. The electrochemical cell of claim 23, wherein said bi-metal element comprises a bi-metal strip.

25. The electrochemical cell of claim 23, wherein said bi-metal element comprises a bi-metal spiral.

26. An electrochemical cell, comprising:

a cell casing;

an air electrode positioned within said cell casing;

an air plenum positioned adjacent to said air electrode; and load responsive means for providing air to said air electrode in response to a predetermined load being placed on said electrochemical cell and for substantially isolating said air electrode in response to said load not being placed on said electrochemical cell, wherein said load responsive means comprises a diaphragm, and wherein said diaphragm comprises an air aperture therein such that when a load is applied to said electrochemical cell, a partial vacuum builds within said air plenum, and said partial vacuum causes said diaphragm to expand and air to pass through said air aperture until said partial vacuum dissipates.

27. The electrochemical cell of claim 26, wherein said air aperture comprises a plurality of air apertures.

28. The electrochemical cell of claim 26, wherein said air aperture comprises a plurality of isolating air apertures.

29. The electrochemical cell of claim 27, wherein said cell casing further comprises a spring attached to said diaphragm, such that said spring forces said diaphragm to contract after said partial vacuum has dissipated.

30. An electrochemical cell, comprising:

a cell casing;

an air electrode positioned within said cell casing;

an air plenum positioned adjacent to said air electrode; and load responsive means for providing air to said air electrode in response to a predetermined load being placed on said electrochemical cell and for substantially isolating said air electrode in response to said load not being placed on said electrochemical cell, wherein said load responsive means comprises a diaphragm, wherein said diaphragm comprises a central aperture, and wherein said central aperture comprises a disk substantially covering said central aperture.

31. The electrochemical cell of claim 30, wherein said cell casing comprises a spring, said spring is attached to said disk such that when a load is applied to said electrochemical cell, a partial vacuum builds within said air plenum, and said partial vacuum causes said disk to pull away from said diaphragm and air to pass through said central aperture.

32. The electrochemical cell of claim 30, wherein said spring forces said disk to cover substantially said central aperture when said partial vacuum dissipates.

* * * * *

UNITED STATES PATENT AND TRADEMARK OFFICE
CERTIFICATE OF CORRECTION

PATENT NO. : 6,350,537 B1  Page 1 of 1
DATED : February 26, 2002
INVENTOR(S) : Pedicini It is certified that error appears in the above-identified patent and that said Letters Patent is hereby corrected as shown below:

<u>Title page,</u>
Item [75], Inventor, "Pedicni" should read -- Pedicini --.
Item [56], References Cited, U.S. PATENT DOCUMENTS, "3,716,718" should read -- 3,716,708 --.
Item [56], References Cited, OTHER PUBLICATIONS, "2.12" should read -- 2-12 --.

<u>Column 11,</u>
Line 39, after "comprising" the semicolon (;) should be a colon (:);
Line 62, "herein" should read -- wherein --.

<u>Column 12,</u>
Line 23, "claim 8" should read -- claim 9 --;
Line 59, after "shape", first occurrence, cancel the comma (,).

<u>Column 14,</u>
Line 34, "claim 30" should read -- claim 31 --.

Signed and Sealed this

Seventeenth Day of September, 2002

Attest:

*Attesting Officer*

JAMES E. ROGAN
*Director of the United States Patent and Trademark Office*